United States Patent [19]

Murata et al.

[11] Patent Number: 5,615,322
[45] Date of Patent: Mar. 25, 1997

[54] IMAGE SYNTHESIZING SYSTEM FOR PRODUCING THREE-DIMENSIONAL IMAGES

[75] Inventors: Hiroyuki Murata, Tokyo; Takashi Yokota, Yokohama, both of Japan

[73] Assignee: Namco Ltd., Tokyo, Japan

[21] Appl. No.: 365,164

[22] Filed: Dec. 28, 1994

Related U.S. Application Data

[63] Continuation of Ser. No. 109,914, Aug. 23, 1993, abandoned.

[30] Foreign Application Priority Data

Aug. 26, 1992 [JP] Japan .................................. 4-252139

[51] Int. Cl.⁶ .................................................. G06T 17/40
[52] U.S. Cl. .......................... 395/133; 395/119; 395/121; 364/DIG. 1
[58] Field of Search .................................. 395/119, 121, 395/122, 133

[56] References Cited

U.S. PATENT DOCUMENTS

| | | | |
|---|---|---|---|
| 3,887,763 | 6/1975 | Hinoshita et al. | 348/425 |
| 3,889,107 | 6/1975 | Sutherland | 382/41 |
| 4,594,673 | 6/1986 | Holly | 395/121 |
| 4,615,013 | 9/1986 | Yan et al. | 395/130 |
| 4,682,217 | 7/1987 | David et al. | 348/44 |
| 4,697,178 | 9/1987 | Heckel | 395/122 |
| 4,819,192 | 4/1989 | Kuragano et al. | 395/121 |
| 4,847,789 | 7/1989 | Kelly et al. | 395/121 |
| 4,935,879 | 6/1990 | Ueda | 395/130 |
| 4,945,495 | 7/1990 | Ueda | 395/130 |
| 5,075,876 | 12/1991 | Seki et al. | 395/121 |
| 5,086,496 | 2/1992 | Mulmuley | 395/121 |
| 5,097,427 | 3/1992 | Lathrop et al. | 395/130 |
| 5,125,074 | 6/1992 | Labeaute et al. | 395/121 |
| 5,175,806 | 12/1992 | Muskovitz et al. | 395/125 |

(List continued on next page.)

FOREIGN PATENT DOCUMENTS

| | | |
|---|---|---|
| 60-250479 | 12/1985 | Japan . |
| 60-246481 | 12/1985 | Japan . |
| 62-186373 | 8/1987 | Japan . |
| 63-80375 | 4/1988 | Japan . |
| 1-131976 | 5/1989 | Japan . |
| 2-308376 | 12/1990 | Japan . |
| 3-45427 | 7/1991 | Japan . |
| 3-45428 | 7/1991 | Japan . |
| 60-256880 | 12/1995 | Japan . |
| 2181929 | 4/1987 | United Kingdom . |
| 2194656 | 3/1988 | United Kingdom . |
| 2259432 | 3/1993 | United Kingdom . |

OTHER PUBLICATIONS

Foley et al, "Computer Graphics Principles & Practice", Addison–Wesley 1990, pp. 266–271, 680–685.
Foley et al, "Computer Graphic Principle & Practice" Addison–Wesley 1990, pp. 686–693.
Heckbert, "Survey of Texture Mapping," IEEE CG&A, Nov. 1986, pp. 56–67.

Primary Examiner—Parshotam S. Lall
Assistant Examiner—Viet Vu
Attorney, Agent, or Firm—Oliff & Berridge

[57] ABSTRACT

An image synthesizing system capable of synthesizing a high-quality image in real time is provided herein. The image synthesizing system is adapted to process a plurality of overlapping polygons sequentially starting from the closest polygon to the view point in a scene. An end flag storage unit stores an end flag at an address corresponding to the processed dot. A processing dot instruction unit reads out this end flag which in turn is used to indicate a dot to be processed to a processor unit. In such a case, the processing dot instruction unit instructs the processor unit so that the end flag of the dot decided to be processed is written back into the end flag storage unit while at the same time only the dot to be processed is treated. Thus, the image synthesization can sequentially be carried out to the polygons starting from the closest polygon to the view point in the scene. At the same time, the computing process to the hidden portion of polygons which have been processed can be omitted.

12 Claims, 14 Drawing Sheets

U.S. PATENT DOCUMENTS

| | | | |
|---|---|---|---|
| 5,179,638 | 1/1993 | Dawson et al. | 395/125 |
| 5,214,753 | 5/1993 | Lee et al. | 395/125 |
| 5,222,205 | 6/1993 | Larson et al. | 395/130 |
| 5,230,039 | 7/1993 | Grossman et al. | 395/130 |
| 5,280,568 | 1/1994 | Obata | 395/121 |
| 5,283,860 | 2/1994 | Einkauf et al. | 395/134 |
| 5,325,470 | 6/1994 | Sumino et al. | 395/121 |
| 5,327,509 | 7/1994 | Rich | 382/108 |
| 5,369,736 | 11/1994 | Kato et al. | 395/125 |
| 5,422,988 | 6/1995 | Koide | 395/129 |

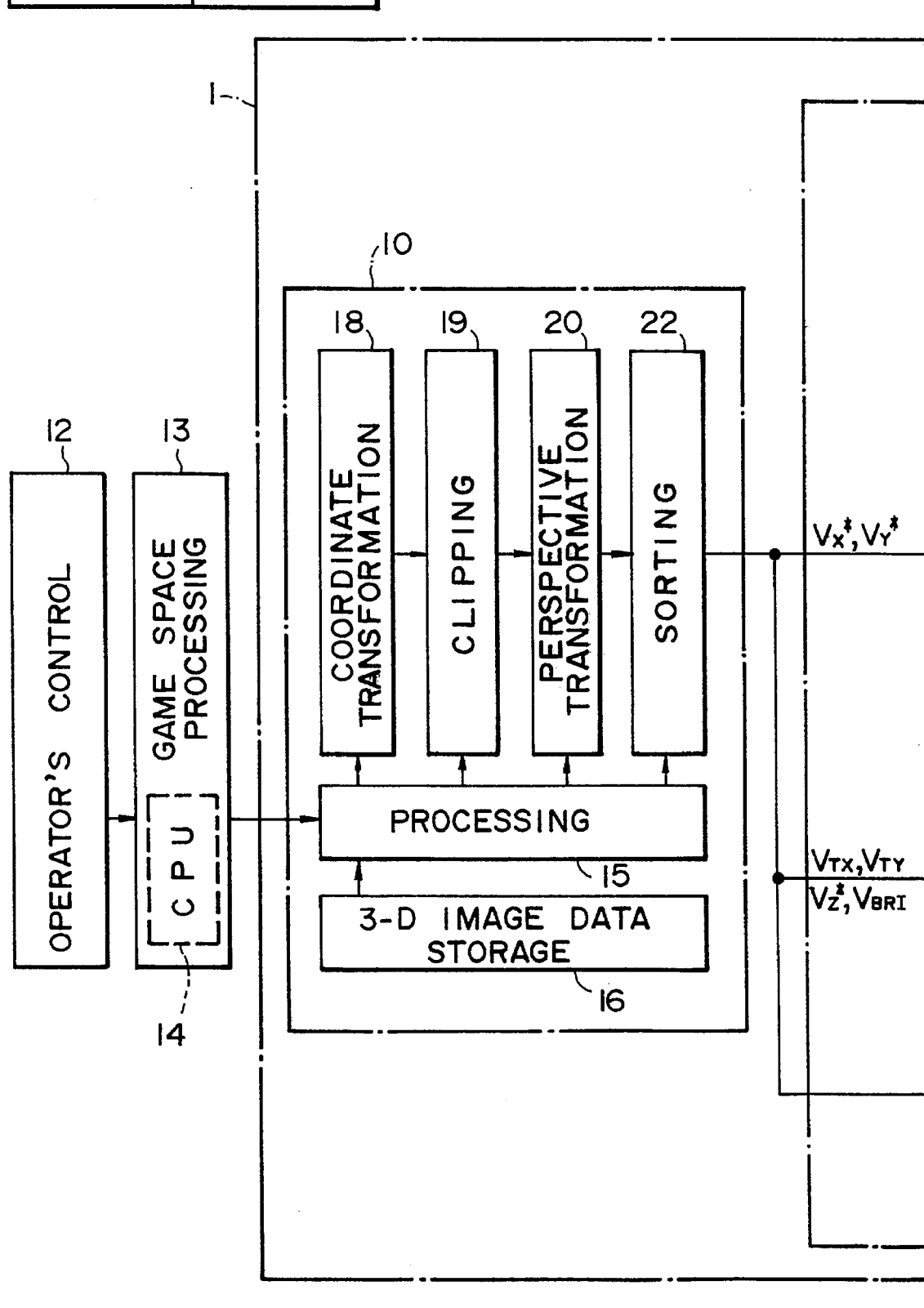

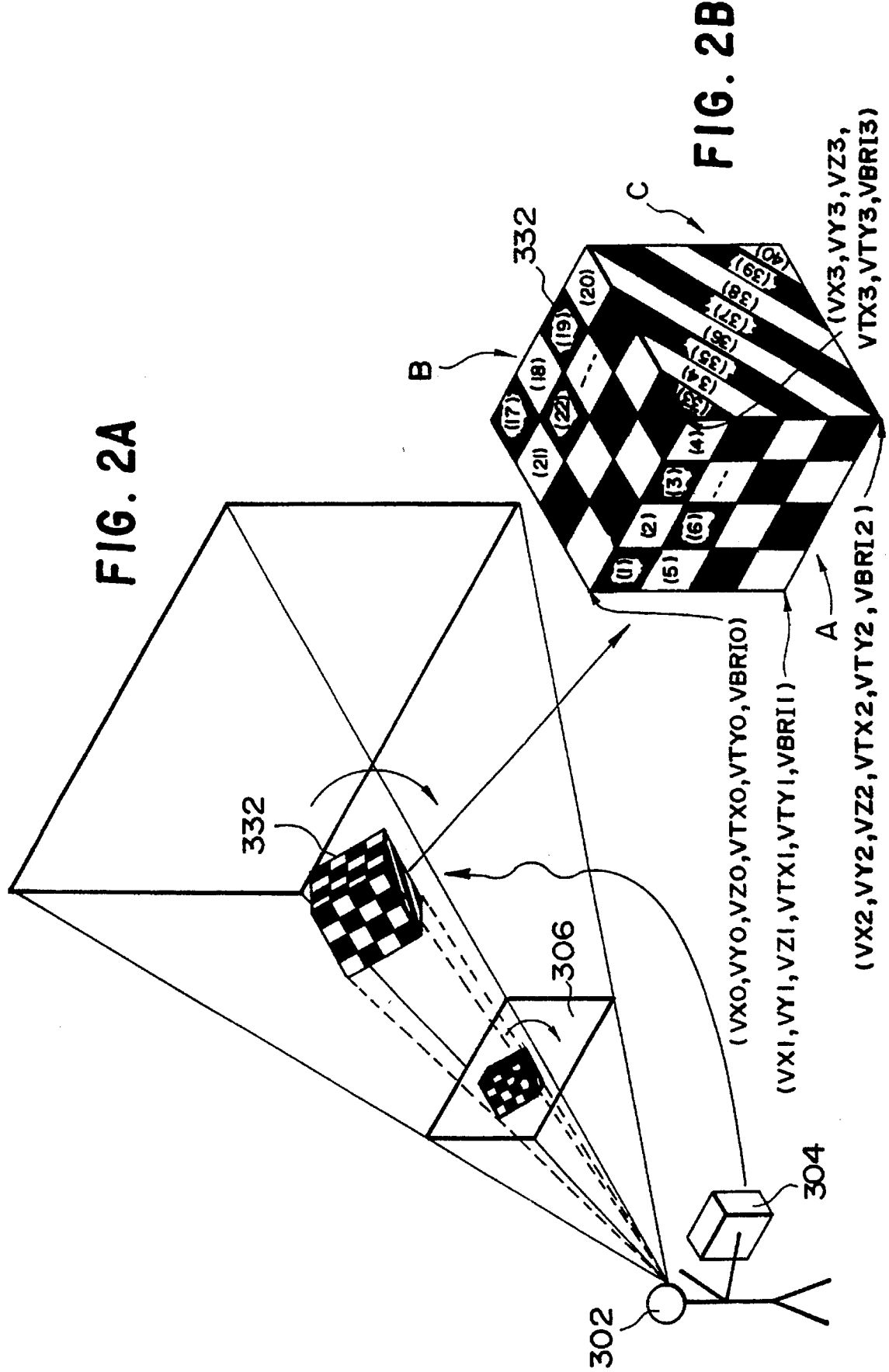

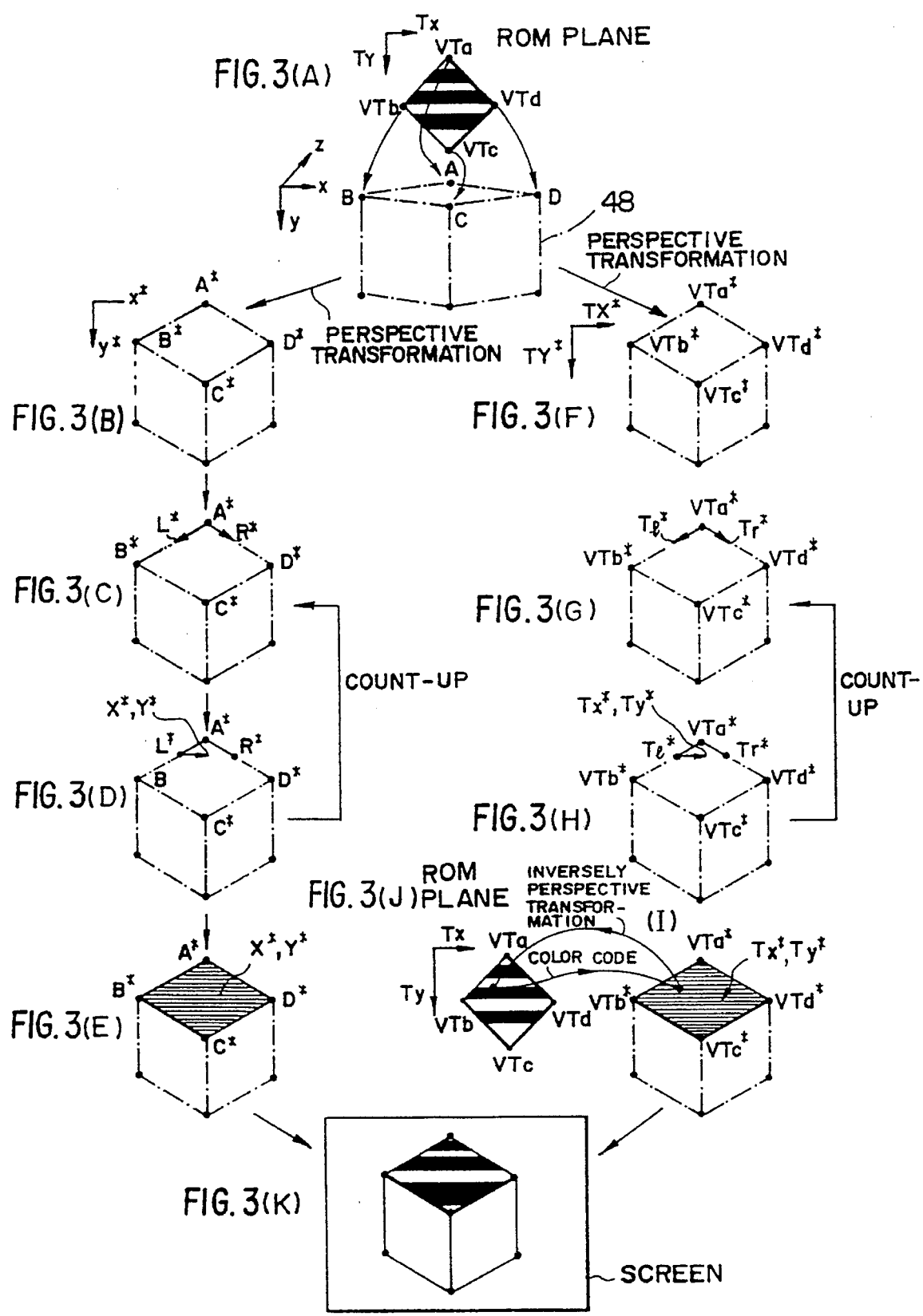

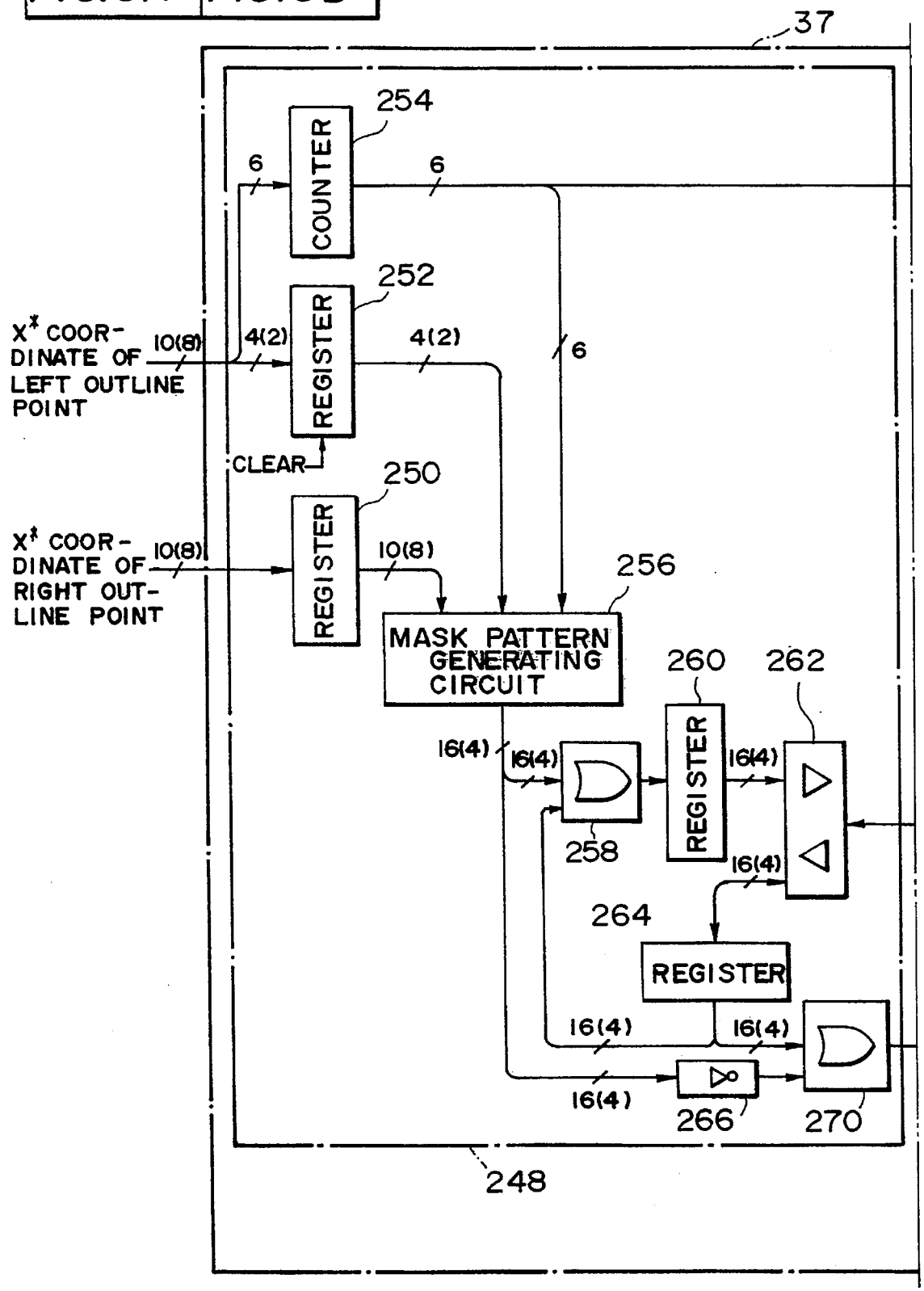

IMAGE SYNTHESIZING SYSTEM FOR PRODUCING THREE-DIMENSIONAL IMAGES

This is a continuation of application Ser. No. 08/109,914 filed Aug. 23, 1993, now abandoned.

BACKGROUND OF THE INVENTION

1. Field of the Invention

The present invention relates to an image synthesizing system which can perform the synthesization of high-quality image in real time.

2. Description of the Related Art

There are known various image synthesizing systems used as in three-dimensional (3-D) games, airplane or other vehicle simulators and so on. Typically, such image synthesizing systems have information of image relating to a 3-D object 300 as shown in FIG. 10, which has previously been stored therein. Information of image is perspective transformed into a pseudo 3-D image 308 on a screen 806. As a player 302 makes an operation with a control panel 304 such as rotation, translation or the like, the system responds to the control signal to perform the processing with respect to rotation, translation or the like of the image of the 3-D object 300 in real time. Thereafter, the processed 3-D image is perspective transformed into the pseudo 3-D image on the screen 306. As a result, the player 302 itself can rotate or translate the three-dimensional objects in real time to experience a virtual 3-D space.

FIG. 11 shows one of such image synthesizing systems. The image synthesizing system will be described as being applied to a 3-D game.

As shown in FIG. 11, the image synthesizing system comprises an operator's control unit 510, a game space processing unit 500, an image synthesizing unit 512 and a CRT 518.

The game space processing unit 500 sets a game space in response to control signals from the operator's control unit 510 and in accordance with a game program which has been stored in a central processing unit 506. Namely, the processing is performed with respect to what position End direction the 3-D object 300 should be arranged in.

The image synthesizing unit 512 comprises an image supply unit 514 and an image forming unit 516. The image synthesizing unit 512 performs the synthesization of a pseudo 3-D image in accordance with information of a game space set by the game space processing unit 500.

In this image synthesizing system, 3-D objects in the game space are defined as polyhedron which are divided into 3-D polygons. As shown in FIG. 12, for example, the 3-D object 300 is represented as a polyhedron which is divided into 3-D polygons 1–6 (polygons 4–6 not shown herein). The coordinates and associated data of each vertex in each of the 3-D polygons (which will be referred to "image data of vertices") have been stored in a 3-D image data storage unit 552.

The image supply unit 514 performs various mathmatical treatments such as rotation, translation and others, and various coordinate conversions such as perspective transformation and others, on the image data of vertices, in accordance with the setting of the game space processing unit 500. After the image data of vertices has been processed, it is permuted in a given order before outputted to the image forming unit 516.

The image forming unit 516 comprises a polygon generator 570 and a palette circuit 580. The polygon generator 570 comprises an outline point processing unit 324 and a line processor 326. The image forming unit 516 is adapted to perform a process of painting all the dots (pixels) in the polygon with a predetermined color data or the like in the following procedure:

First of all, the outline point processing unit 324 calculates left-hand and right-hand outline points which are intersection points between polygon edges AB, BC, CD, DA and other polygon edges and scan lines. Subsequently, the line processor 326 paints, with specified color data, sections between the left-hand and right-hand outline points, for example, sections between L and Q; Q and R as shown in FIG. 12. In FIG. 12, the section between L and Q is painted by red color data while the section between Q and R is painted by blue color data. Thereafter, the color data used on painting are transformed into RGB data in the palette circuit 580, and then the RGB data in turn is outputted to and displayed in CRT 518.

When such a painting is to be carried out and if a plurality of polygons are overlapped with one another, it is required that only the parts of the'polygons which are not overlapped by polygons closer to the view point. For this purpose, the image synthesizing system of the prior art uses a technique of sequentially painting the polygons, starting from the remotest polygon on from the view point on the screen.

However, such a type of image synthesizing systems are usually required to perform the real-time image processing. More particularly, they are required to update image data contained in one scene (in some cases, two scenes) per one field, for example, per 1/60 seconds. Therefore, the image synthesizing systems must treat the image at high speed, which would otherwise reduce the quality of image. The efficiency of the high-speed image processing most depends on the painting step wherein all the dots in the image are painted with the predetermined colors.

In the prior art, the polygons are sequentially painted starting from a polygon remotest from the view point in the screen. Therefore, entire area of the polygons appearing in one field including overlapped parts must be painted through the most time consuming painting step. Any polygon part hidden by the overlap between the polygons will never be represented on the screen. The prior art will unnecessarily treat such a hidden polygon part. This will provide an unsatisfactory technique of processing the image in real time.

When it is required to paint the polygons starting from the remotest polygon from the view point in the scene and if an increased number of polygons could not be painted within one field, the data relating to these polygons will be lost starting from that of the closest polygon to the view point in the scene. However, the closest polygon to the view point is usually one that is most observed by the player and most important in the game. The loss of such important polygons are not desirable in maintaining the quality of scene higher.

SUMMARY OF THE INVENTION

In view of the above problem in the prior art, it is an object of the present invention to provide an image synthesizing system which is particularly optimum on processing images in real time.

To this end, the present invention provides an image synthesizing system for synthesizing pseudo 3-D images by subjecting 3-D images defined by 3-D polygons to the perspective transformation onto a given projection plane, the improvement comprising:

image forming means responsive to the respective vertices image data of vertices of the perspective transformed polygons for sequentially determining the image data of dots in the polygons, starting from the closest polygon to the view point in the scene, through a given computing process;

end flag storage means for storing each end flag which represents the end of said computing process at an address corresponding to a dot for which the computing process has been completed by said image forming means; and processing dot instruction means for reading said end flag from said end flag storage means, for instructing a dot to be processed based on the read end flag to said image forming means, and for writing the end flag of the dot decided to be processed back to said end flag storage means as a processed dot, which has increased processing speed by instructing said image forming means only to perform the computing process on the dots decided to be processed.

In accordance with the present invention, the image forming means performs the computing process for sequentially determining the image data of each dot in the polygons, starting from the closest polygon to the view point in the scene. The end flag storage means has stored the end flags relating to the processed dots. The processing dot instruction means reads an end flag from the end flag storage means and determines whether or not a dot corresponding to the read end flag should be processed. If it is determined that dot should be processed, its end flag will be written back into the end flag storage means as a newly processed dot. The processing dot instruction means then instructs, to the image forming means, that only the dot decided to be processed should be subjected to said computing process. Thus, the present invention can form a pseudo 3-D image sequentially starting from the closest polygon to the view point in the scene. Even if the computing process has terminated during the painting, the data of the closest polygon to the view point can effectively be prevented from being lost. In accordance with the present invention, the end flag relating to the hidden polygon part has been written in the end flag storage means after the close polygon to the view point had been processed. When it is to treat the next remote polygon from the view point, therefore, the process part relating to the hidden polygon part can be omitted. This can increase the processing speed. Particularly, since the present invention uses the end flag having less data to judge whether or not the dot relating to that end flag belongs to the hidden polygon part, the capacity of the storage means can be saved in addition to increase in the processing speed.

In such a case, it is desirable that said end flags are stored in said end flag storage means for every set of dots and wherein said processing dot instruction means reads out the end flags for every set of dots, said read out end flag being used to decide a dot to be processed and to indicate the dot to be processed to said image forming means.

In such a manner, the processing dot instruction means can read end flags by the set of dots (e.g. N in number) and can determine whether or not the set of dots should be processed. The process of the polygon part hidden by the polygon closer to the view point can be skipped by dots of N in maximum number. As a result, the image synthesizing system of the present invention can treat the image at the maximum speed N times that of the prior art in which the process was performed simply by increasing one dot at a time.

It is further desirable that said computing process of said image forming means is carried out to determine left and right outline points which are intersecting points between edges of the polygon and the respective scan lines, based on the image data of vertices of the perspective transformed polygon and to determine the image data of each dot on the scan lines connecting the left and right outline points and wherein said processing dot instruction means uses a mask pattern indicating dots between said left and right outline points and said end flag indicating the processed dots to decide unprocessed dots between said left and right outline points.

The present invention can use the mask pattern to judge whether or not dots are on the line between the left-hand and right-hand outline points. Further, the present invention can use the end flags to judge whether or not dots have been processed. Dots to be processed are unprocessed dots in the dots between the left-hand and right-hand outline points. In such a manner, the present invention can very easily determine dots to be processed simply by using the mask pattern and end flags.

Particularly, the present invention may treat a mask pattern and end flag for each set of dots to determine a plurality of dots to be processed at a time. As a result, the image synthesizing system of the present invention using the mask pattern and end flag becomes optimum for determining a plurality of dots to be processed at a time.

In such a case, said image forming means is adapted to compute the image data of the dots defining said polygon through a given process, based on the color data and representing coordinates of vertices of said polygon.

Thus, the synthesization of image can simply and easily be performed by using polygons.

The image forming means is adapted to compute the image data of the dots defining said polygon through a given process, based on data of the representing coordinates and texture data of vertices of said polygon.

In such an arrangement, pseudo 3-D images of higher quality can be synthesized in real time through the texture mapping.

BRIEF DESCRIPTION OF THE DRAWINGS

FIG. 2 is a schematic diagram illustrating a technique of synthesizing the image of a 3-D object having its mapped texture.

FIGS. 3A–3K are schematic views visually illustrating the summary of an image processing procedure used in this embodiment.

DETAILED DESCRIPTION OF THE PREFERRED EMBODIMENTS (1) General Arrangement

Figure 1B:
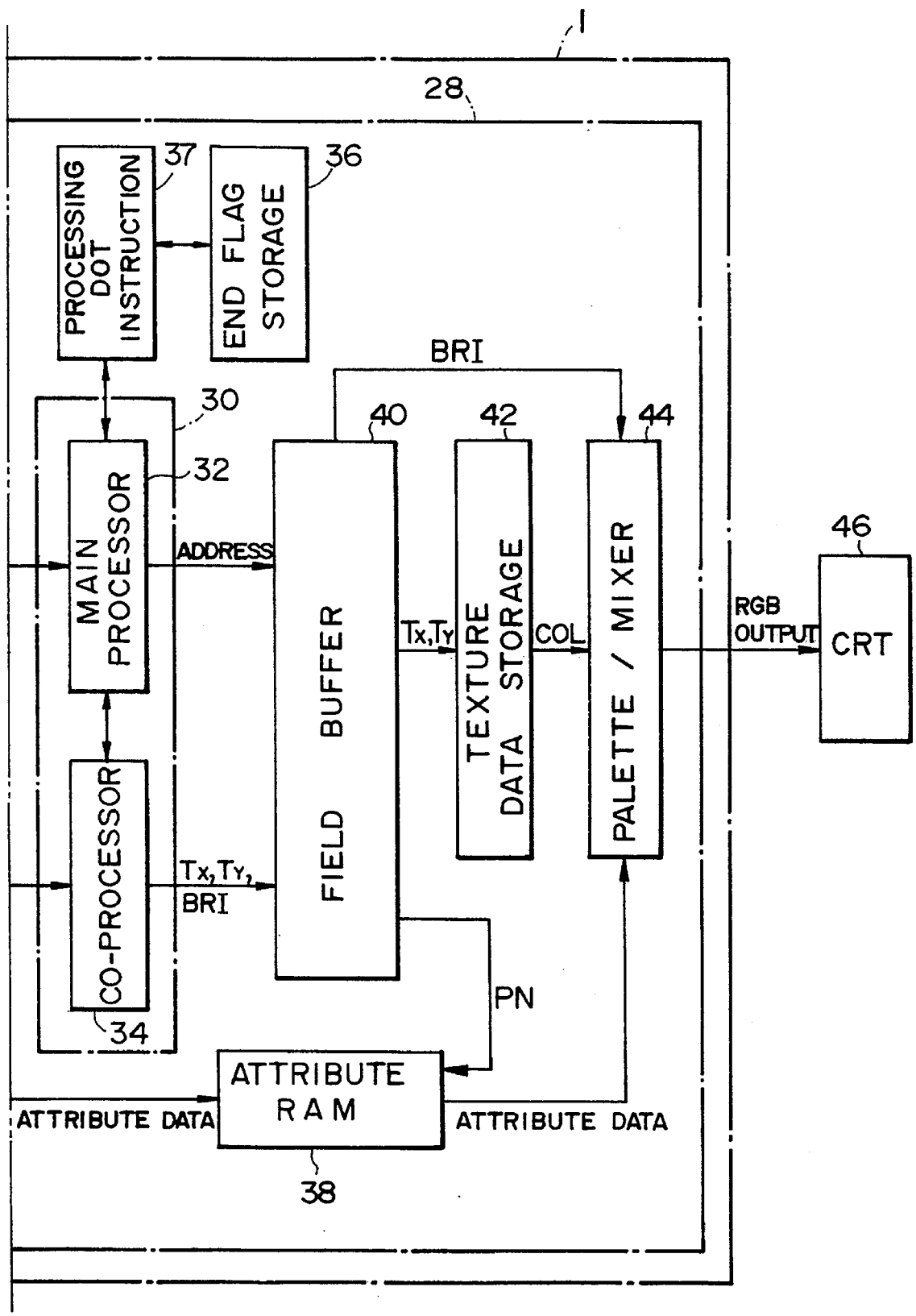
FIG. 1 is a block diagram, split into FIGS. 1A and 1B, of one preferred embodiment of an image synthesizing system constructed in accordance with the present invention.

Referring to FIG. 1, there is shown one embodiment of an image synthesizing system constructed in accordance with the present invention, which comprises an operator's control unit 12, a game space processing unit 13, an image synthesizing unit 1 and a CRT 46. The image synthesizing unit 1 comprises an image supply unit 10 and an image forming unit 28. The image synthesizing system will be described as applied to a 3-D game.

The game space processing unit 13 sets a game space in accordance with a game program stored in a central processing unit 14 and a control signal from the operator's control unit 12. More particularly, the game space processing unit 13 computes the setting data of a game space which is defined by the positions and directions of 3-D objects (e.g. airplanes, mountains, buildings, etc.), the position and view of a player and so on. The computed setting data is then outputted to the image supply unit 10 in the image synthesizing unit 1.

The image supply unit 10 performs a given computing process, based on the setting data of the game space. More particularly, the computing process includes the coordinate transformation from the absolute coordinate system to the view coordinate system, the clipping, the perspective transformation, the sorting and so on. The processed data is outputted to the image forming unit 28. In such a case, the output data is represented as divided into data in the respective polygons. More particularly, the data is defined by image data of vertices including the representing coordinates, texture coordinates and other associated information of each vertex in the polygons.

The image forming unit 28 computes the image data in the interior of the polygon from the image data of vertices with the computed data being outputted to the CRT 46.

The image synthesizing system of this embodiment can carry out the image synthesization more effectively through two techniques known as texture mapping and Gouraud shading. The concepts of these techniques will briefly be described.

FIG. 2 shows the concept of the texture mapping technique.

When it is to synthesize a pattern such as grid or stripe on a 3-D object 300 at each surface as shown in FIG. 2, the prior art divided the 3-D object 300 into 3-D polygons 1–80 (polygons 41–80 not shown herein), all of which were processed. This is because the image synthesizing system of the prior art can paint the interior of one polygon with only one color. When it is wanted to synthesize a high-quality image having a complicated pattern, therefore, the number of polygons will so increase that the synthesization of high-quality image substantially becomes impossible.

Therefore, the image synthesizing system of the present invention performs various treatments such as rotation, translation, coordinate transformation such as perspective transformation and clipping to each of 3-D polygons A, B and C defining the respective surfaces of the 3-D object 332 (more particularly, each of the vertices in the respective 3-D polygons). Patterns such as grids and stripes are handled as texture, separating from the treatment of the polygons. Namely, as shown in FIG. 1, the image forming unit 28 includes a texture data storage unit 42 in which texture data to be applied to the 3-D polygons, that is, image data relating to the patterns such as grids, stripes and the like have been stored.

The texture data storage unit 42 stores the texture data each of which addresses is given as texture coordinate VTX, VTY of each vertex in the respective 3-D polygons. More particularly, texture coordinates (VTX0, VTY0), (VTX1, VTY1), (VTX2, VTY2) and (VTX3, VTY3) are set for each vertex in the polygon A, as shown in FIG. 2.

The image forming unit 28 uses the texture coordinates VTX, VTY for each vertex to determine texture coordinates TX, TY for all dots in the polygon. Texture data corresponding to the determined texture coordinates TX, TY is read out from the texture data storage unit 22. Thus, the image of the 3-D object onto which the texture of grids or stripes as shown in FIG. 2 is applied can be synthesized.

Such a technique can greatly reduce the amount of data to be processed. As a result, the present invention can provide an image synthesizing system which is optimum for synthesizing a high-quality image in real time.

As described, the image synthesizing system of the present invention represents the 3-D object 300 as a mass of 3-D polygons. It thus raises a problem with respect to the continuity in brightness data at the boundary of each 3-D polygon. For example, when it is wanted to represent a sphere using a plurality of 3-D polygons and if all the dots (pixels) in the polygon are set at the same brightness, the boundary of the 3-D polygon will not be represented to have a "rounded surface". In order to overcome such a problem, the image synthesizing system of the present invention uses a technique known as Gouraud shading. Like the aforementioned texture mapping, Gouraud shading has given brightness data VBRI0–VBRI3 to each vertex in the respective 3-D polygons, as shown in FIG. 2. When the image forming unit 28 is to display a final image, brightness data for all the dots in the polygon are determined by an interpolation method using the brightness data of vertices, namely VBRI0, VBRI1, VBRI2, VBRI3. Thus, the aforementioned "rounded surface" problem can be over-come while the processing required by the image synthesizing system can be reduced. Therefore, the present invention can provide an image synthesizing system which is optimum for synthesizing a high-quality image in real time.

(2) Image Supply Unit

The image supply unit 10 performs the following treatment. First of all, a processing unit 15 reads out the image data of a 3-D object to be arranged in a game space from a 3-D image data storage unit 16. The processing unit 15 then outputs the image data of the 3-D object to a coordinate transformation unit 18 after they have been added by positional and directional data. Thereafter, the coordinate transformation unit 18 performs the coordinate transformation from the absolute coordinate system to the view coordinate system. Subsequently, clipping, perspective transformation and sorting units 19, 20 and 22 perform clipping, perspective transformation and sorting, respectively. The image data of vertices of the processed polygon is outputted to the image forming unit 28.

The sorting unit 22 permutes the output order of the image data of vertices of the polygon in accordance with a predetermined priority. More particularly, the sorting unit 22 sequentially outputs the image data of vertices of the polygons to the image forming unit 28, starting from the closest polygon to the view point in the scene. Therefore, the image forming unit 28 will sequentially process the polygons, starting from the more overlying polygon in the scene.

Since the polygons are processed by the image forming unit 28, starting from the closest polygon to the view point in the scene, the image synthesizing system of the present invention will greatly reduce the loss of the data of the close polygons to the view point. Since the lost data belongs to the remote polygons from the view point in the scene, the view of the player will extremely little be influenced by the lost data. Thus, a high-quality image can be formed by the image synthesizing system.

(3) Image Forming Unit

The image forming unit 28 functions to compute the image data of all the dots in the polygons from the image data of vertices of the polygons which are inputted from the sorting unit 22 into the image forming unit 28 in a given sequence. The operation of the image forming unit 28 will schematically be described below.

First of all, a processor unit 30 sequentially receives the image data of vertices of polygons including the representing coordinates, texture coordinates, brightness data and other associated information of vertices from the sorting unit 22. Common data shared by all of the dots in a polygon is inputted into an attribute RAM unit 38 as attribute data.

The processor unit 30 uses the representing coordinates, texture coordinates and brightness data of vertices to determine representing coordinates, texture coordinates TX, TY and brightness data BRI all the dots in the polygons. The texture coordinates TX, TY and the brightness data BRI thus determined are written in a field buffer unit 40 using said representing coordinates as addresses.

A main processor 32 is connected to processing dot instruction unit 37 and end flag storage unit 36. These units 37 and 36 are used to omit the processing operation for any dot which has already been processed and painted. Load on the subsequent computing process can greatly be reduced. The details of the processing dot instruction unit 37 and end flag storage unit 36 will be described later.

On displaying an image, the texture coordinates TX, TY are read out from the field buffer unit 40 and used as addresses to read the texture data from the texture storage unit 42. The texture data is used in a palette/mixer circuit 44 with the attribute data from the attribute RAM unit 38 to form RGB data which in turn is outputted as an image through CRT 46.

FIGS. 3A–3K visually show the summary of the computing process carried out in the image forming unit 28. As described, the image forming unit 28 performs the computing process for forming all the image data of the polygon based on the image data of vertices of the polygon. In such a case, the texture data to be mapped to the polygon has been stored in the texture data storage unit 42. To read out the texture data from the unit 42, the texture coordinates TX, TY are required. FIGS. 3F–3I visually show the procedure of determining all the perspective transformed texture coordinates TX*, TY* in the polygon. This procedure is carried out by a coprocessor 34. FIGS. 3B–3E visually show the procedure of determining the perspective transformed representing coordinates X*, Y* which are coordinates to represent the texture data. This procedure is carried out in the main processor 32. As shown in FIG. 3J, inversed perspective transformation is performed on the computed TX*, TY* to obtain the texture coordinates TX, TY which in turn are used to read out the texture data from the texture data storage unit 42. As shown in FIG. 3K, finally, the read texture data will be caused to correspond to the computed coordinates X*, Y* to perform the image synthesization. The summary of the computing process will be described in connection with the respective steps shown in FIGS. 3A–3K.

In FIG. 3A, texture coordinates VTa, VTb, VTc and VTd are caused to correspond to vertices (e.g. A, B, C and D) in a polyhedron 48. These VTa–VTd are used to address a texture data to be mapped to a polygon which is formed by the vertices A–D. More particularly, they are texture coordinates for indicating addresses used to read out the texture data which has been stored in the texture data storage unit 42 at its storage means.

In FIGS. 3B and 3F, the representing coordinates A–D and texture coordinates VTa–VTd of vertices are perspective transformed into perspective transformed representing coordinates A*–D* and perspective transformed texture coordinates VTa–VTd* of vertices, respectively. Thus, the X-Y coordinate system as well as the TX-TY coordinate system will be subjected to the perspective transformation, thereby maintaining the linearity between the respective coordinate systems.

As shown in FIGS. 3C and 3G, the outline points of a polygon formed by perspective transformed coordinates A*–D* and perspective transformed texture coordinates VTa*–VTd* of vertices are then linearly interpolated. Namely, coordinates L*, R* of left and right outline points and texture coordinates TI*, Tr* of left and right outline points in FIGS. 3D and 3H are linearly interpolated.

As shown in FIGS. 3D and 3H, the coordinates L*, R* of the left and right outline points and the texture coordinates Ti*, Tr* of the left and right outline points are then used to linearly interpolate the coordinates of each dot on scan lines connecting these outline points.

The procedure described with reference to FIGS. 3C, 3G and 3D, 3H are sequentially repeated. Finally, the perspective transformed representing coordinates X*, Y* and perspective transformed texture coordinates TX*, TY* for all the dots forming that polygon are linearly interpolated, as shown in FIGS. 3E and 3I.

As shown in FIG. 3J, inverted perspective transformation is performed on the perspective transformed texture coordinates TX*, TY* to obtain texture coordinates TX, TY which in turn are used to read out color codes from the texture data storage unit 42.

Thus, the color codes read out are caused to correspond to the perspective transformed representing coordinates X*, Y*. As shown in FIG. 3K, therefore, an image is synthesized on a screen to enable the texture mapping without loss of sense of perspective and linearity. Although FIGS. 3A–3K do not show the process of computing the perspective transformed representing coordinate Z* and brightness data BRI, it is substantially similar to the process of computing the coordinates TX, TY in FIGS. 3A–3K.

(4) End Flag Storage and Processing Dot Indication Units

Figure 4:
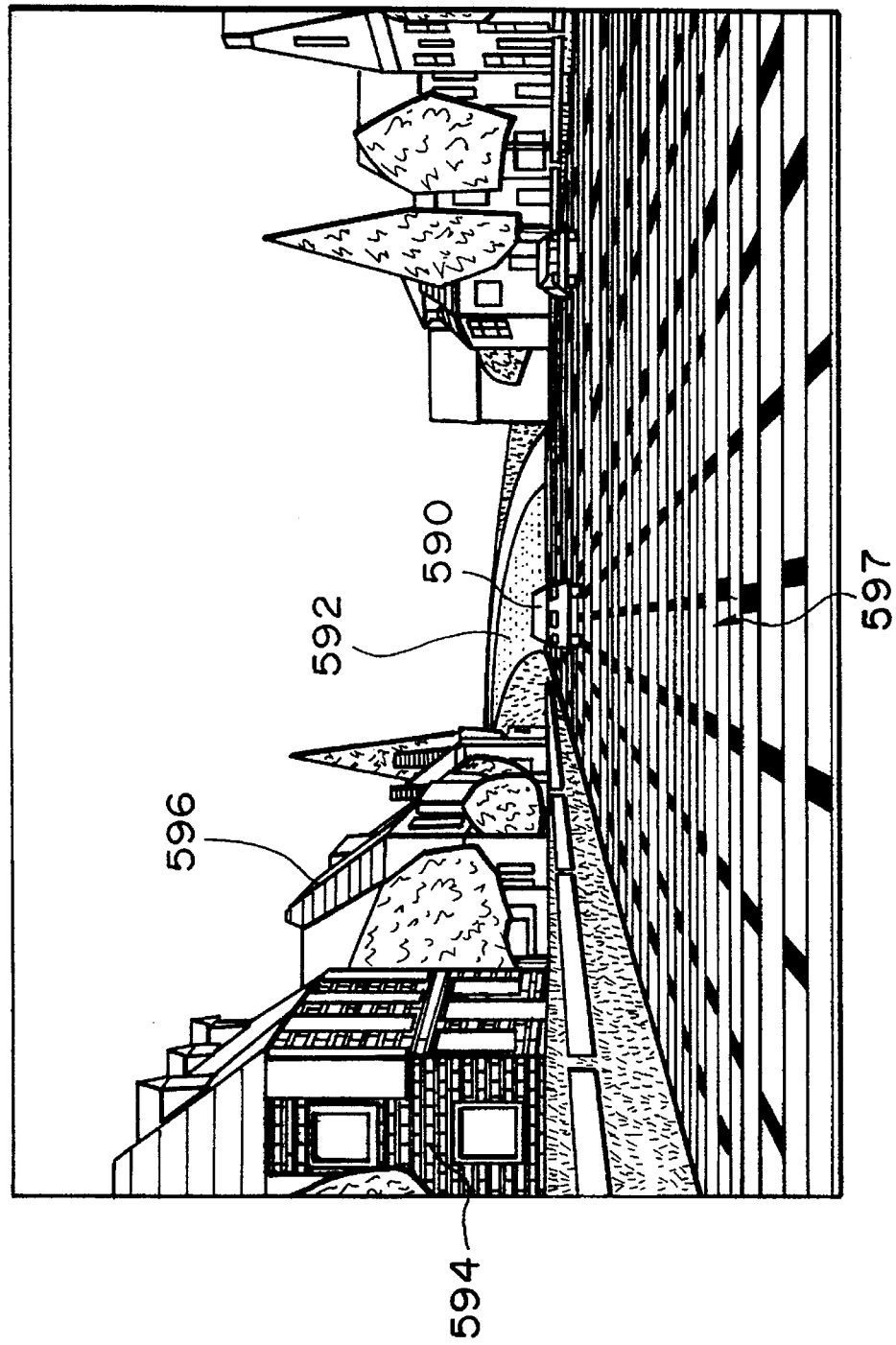
FIG. 4 is a view showing a pseudo 3-D image synthesized by this embodiment.
Figure 5:
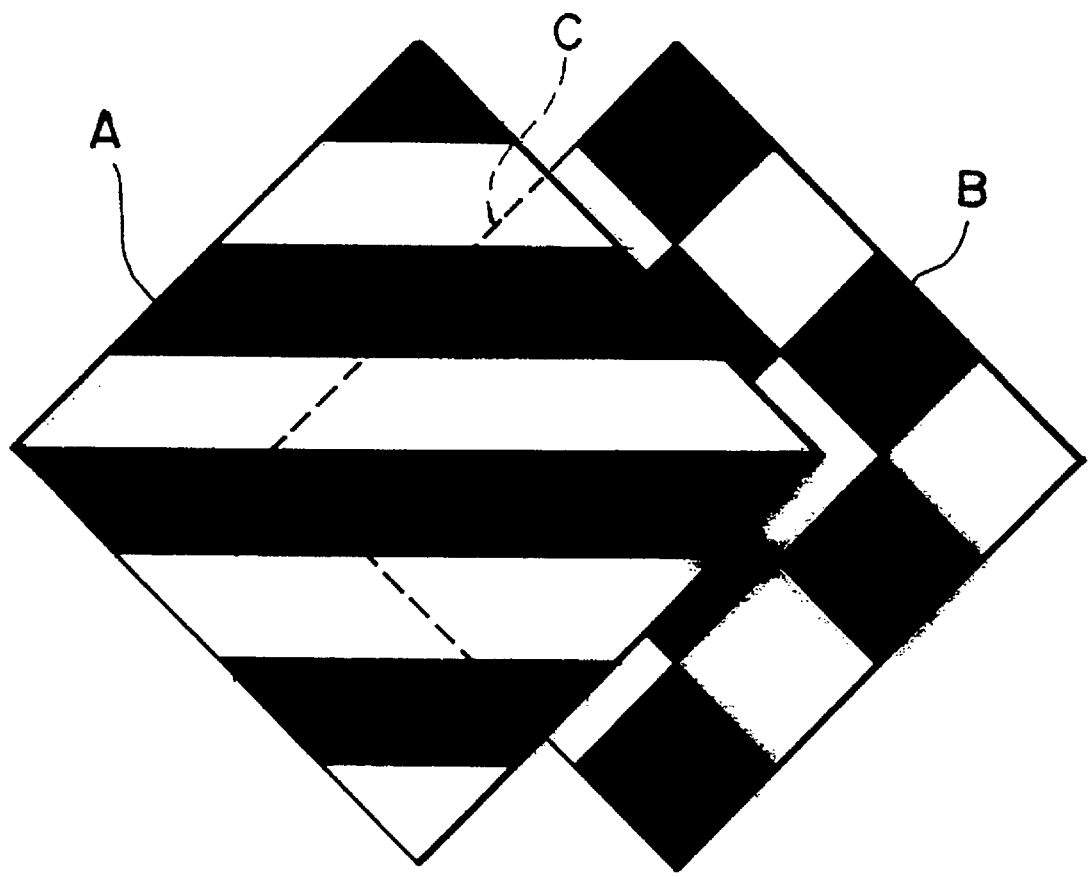
FIG. 5 is a schematic view showing the relationship between the polygons, which are close to and remote from the view point, in a scene.

By computing the image data of the respective polygons to synthesize them, such a pseudo 3-D image as shown in FIG. 4 is finally displayed on the screen. In FIG. 4, that portion of a distant road 592 hidden by a vehicle 590 is not required to be illustrated on the screen. Similarly, that portion of house 596 hidden by the other house 594 is not required to be displayed on the screen. Therefore, such hidden portions should be removed. The image synthesizing system of this embodiment is adapted to treat the polygons sequentially starting from the closest polygon to the view point in the scene, as described. As shown in FIG. 5, thus, the computing process is first performed to a polygon A. When the computing process is then to be made to another polygon B (which is behind the polygon A), it is required to omit the computing step with respect to an overlapping polygon portion C. For this purpose, this embodiment comprises the end flag storage unit 36 and the processing dot instruction unit 37.

The end flag storage unit 36 has storage plane corresponding to dots in the screen with one-to-one. The storage planes has stored data known as end flag for each dot, for example, in the unit of one bit. The end flag is one that is used to judge whether or not a dot has been processed. For example, when any one of the dots defining the polygon A of FIG. 5 has been processed, "1" is written by the processing dot instruction unit 37. The processing dot instruction unit 37 monitors the end flags at all times. When the computing process is then to be made to the polygon B, it will be omitted for a dot having its end flag being "1". Thus, the computing process is not required to polygon areas which have been shaded or painted. The processing speed can greatly be increased.

Figure 6B:
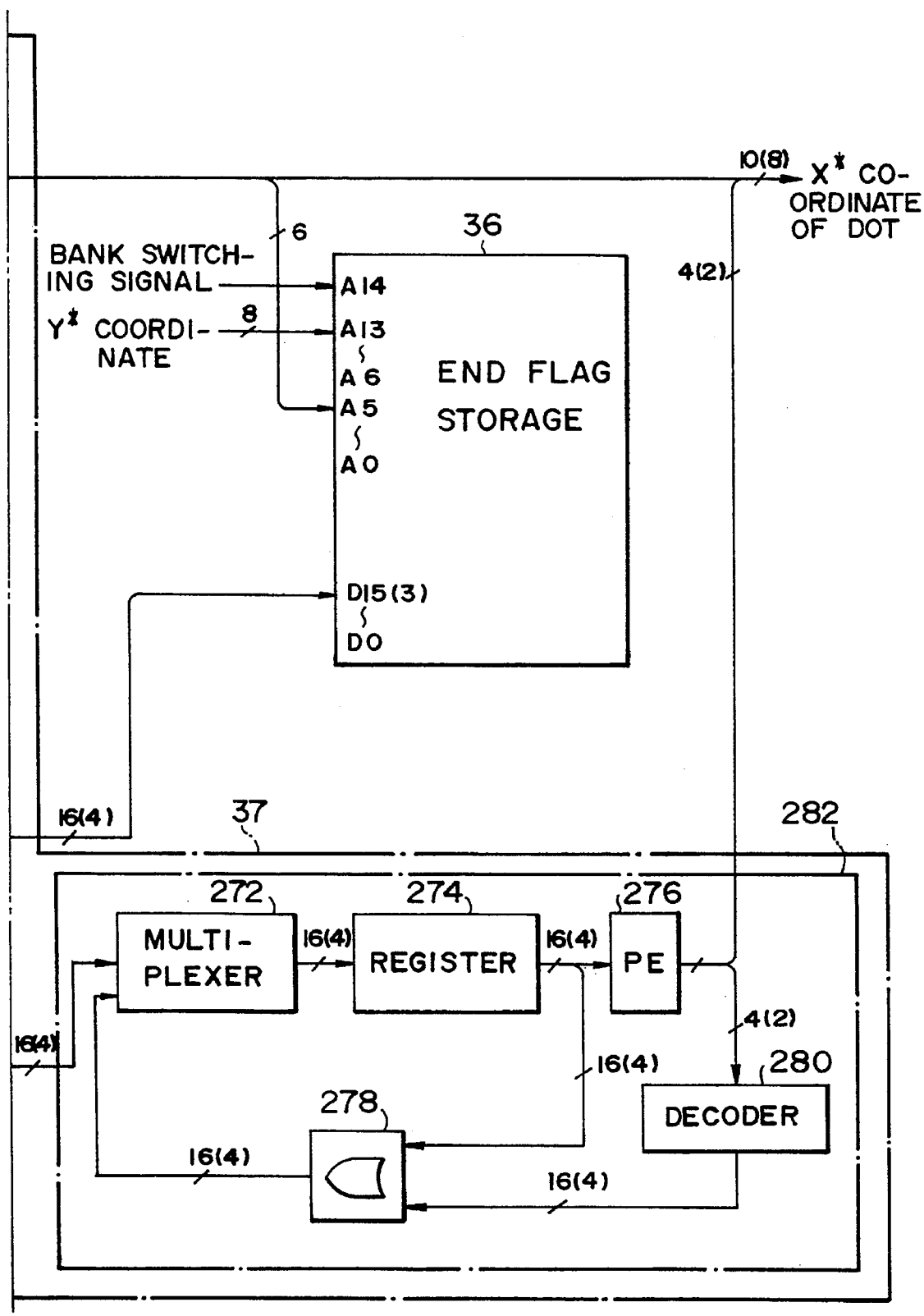
FIG. 6 is a block diagram, split into FIGS. 6A and 6B showing the structure of a processing dot instruction unit and the connection between processing dot instruction unit and an end flag storage unit.

FIG. 6 is a block diagram showing the connection between the processing dot instruction unit 37 and the end flag storage unit 36. The processing dot instruction unit 37 comprises an end flag decision unit 248 and an empty dot detection loop 282.

The end flag decision unit 248 functions to decide a dot to be processed by the processor unit 30. The end flag of the dot decided to be processed is reset as a newly processed dot by the end flag decision unit 248 and then written back into the end flag storage unit 36. Since these dot instruction and rewriting are carried out for every set of dots, the processing speed can greatly be increased.

The empty dot detection loop 282 sequentially detects dots decided to be processed by the end flag decision unit 248. Based on the result of detection, the X* coordinate of a dot to be processed is determined and outputted to the processor unit 30.

The end flag storage unit 36 is large enough to store end flags corresponding to two scenes. The end flag is stored in the end flag storage unit 36 so that one bit corresponds to one dot. The end flags corresponding to one scene are cleared to be "0" at the beginning of one-scene processing. When the computing process terminates, an end flag for one dot is set at "1" to represent the end of the computing step for that dot.

The end flag storage unit 36 has a data bus of plural bits, for example, of 16 bits and can access 16-bit data simultaneously. In the computation of dot, the end flag storage unit 36 is referred to at all times. Therefore, the end flags corresponding to 16 dots can be referred to. A dot having its end flag being "1" will not be subjected to the computing process. Thus, such dots will be skipped at high speed, that is, by 16 dots maximum. If dots on a polygon to be processed are hidden by the other polygon, the processing speed will be about 16 times higher than the prior art in which processing proceeds only with the increment of X* coordinate.

In this embodiment, the end flag storage unit 36 is formed for two scenes. This is because the access to the end flag storage unit 36 in the dot processing operation may be carried out in parallel with the clearing of one scene.

The fact that the polygons are sequentially processed starting from the closest polygon to the view point in the scene is also based on the purpose that the processing speed should be increased.

The end flag storage unit 36 will be described in more detail with reference to FIG. 6 which shows its block diagram.

First of all, the end flag decision unit 248 receives X* coordinates of left and right outline points which have been generated by the computation of outline points. It is now assumed that each of these coordinates is defined by data of 10 bits. The X* coordinate of right outline point is stored in a register 250. Low order four bits of the X* coordinate of the left outline point is stored in a register 252 while high order six bits are used as an initial value in a counter 254. The output of the counter 254 is sent to the end flag storage unit 36 at its addresses A0–A14 to address the end flag storage unit 36, with the Y* coordinate of the outline point and bank switching signal. Namely, the counter 254 will count up the addresses for every four bits, that is, for every 16 dots. Thus, a group of end flags corresponding to data or objective 16 dots is read out from the end flag storage unit 36 for every 16 dots and then sent to and stored in a register 264 through a bidirectional buffer 262.

On the other hand, a mask pattern generating circuit 256 generates a mask pattern for every 16 ds such that inner dots located between the left and right outline points are made to be "1" and outer dots to be "0". At an OR circuit 258, the data stored in the register 264 is taken logical OR with this mask pattern. As a result, a data will be formed in which the end flag of an "empty dot" or a dot to be newly processed is updated to "1". This data is stored in the register 260 before it is written back into the end flag storage unit 36 through the bidirectional buffer 262. In such a manner, the data for the objective 16 dots among the end flag data stored in the end flag storage unit 36 will be updated.

The mask pattern is also inverted by an inverting circuit 266. The inverted mask pattern is taken logical OR with the data stored in the register 264. As a result, data will be produced in which dots outside of the left and right outline points and dots hidden by the other polygon(s) are set at "1" while only empty dots are set at "0", which will be referred to "empty dot data". The empty dot data is supplied to an empty dot detection loop 282.

In the empty dot detection loop 282, a multiplexer 292 fetches the empty dot data only when a register 274 is to be initialized and data from a feedback loop in the other events. This will form its own loop. The empty dot data stored in the register 274 is inputted into a priority encoder 276. The priority encoder 276 detects a dot having the minimum X* coordinate in the empty dots and outputs it as 4-bit data. The X* coordinate of an empty dot or a dot to be processed will be formed by adding 6-bit data from the counter 254 to the high order of the 4-bit data.

The output of the priority encoder 276 is inputted into a decoder 280 which produces "data that only objective dots are set at '1'". Such a data is taken logical OR with the output of the register 274 at an OR circuit 278 to produce "data that only objective dots in the empty dots data are updated to '1'". Such an updated data is written back into the register 274 through the multiplexer 272. A series of steps in the empty dot detection loop 282 are repeated until all the bits in the register 274 become "1".

When the operation in the empty dot detection loop 282 terminates, the counter 254 counts up to read out the next 16 dots data from the end flag storage unit for repeating the above cycle.

If any right outline point is contained in the 16-dots data, new X* coordinates of the left and right outline points will be inputted to repeat the process.

Figure 7:
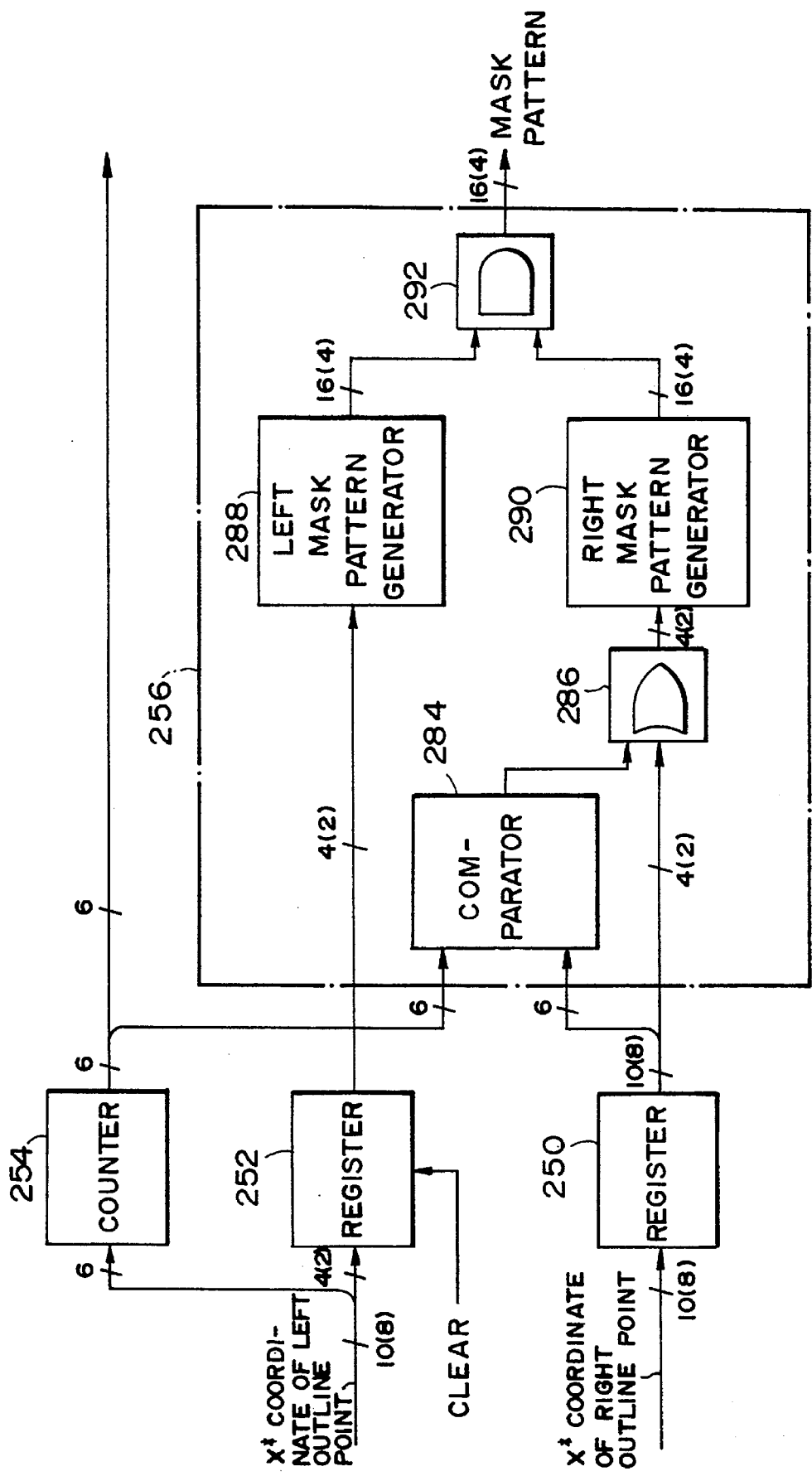
FIG. 7 is a block diagram of a mask pattern generating circuit.

FIG. 7 is a block diagram of the mask pattern generating circuit 256. The mask pattern generating circuit 256 comprises a comparator 284, OR circuits 286 and 292, a left mask pattern generating circuit 288 and a right mask pattern generating circuit 290. The operation of the mask pattern generating circuit 256 will be described in brief.

Four low order bits in the X* coordinate of the left outline point are inputted into the left mask pattern generating circuit 288. The left mask pattern generating circuit 288 generates a mask pattern by which among the 16 dots containing the left outline point, the dot specified by the four low order bits and all the dots located in the right side of the specified dot are set at "1". When the process proceeds and when the processing of the first 16 dots containing the left outline points terminates, the contents of the register 252 is cleared. Thus, the left mask pattern generating circuit 288 is cleared to produce a 16-dot mask pattern by which all dots to be subsequently processed are set at "1". Consequently, the left mask pattern generating circuit 288 will generate a left mask pattern by which all dots located rightward from the X* coordinate of the left outline point are set at "1".

Six high order bits of X* coordinate of the dot being processed, which are the output of the counter 254, are always compared with six high order bits of the X* coordinate of the right outline point by the comparator circuit 284. The comparator circuit 284 continues to output "1" until the output of the counter 254 agree with the six high order bits of the X* coordinate of the right outline point. The output of the comparator circuit 284 is applied to the right mask pattern generating circuit 290 through the OR circuit 286 at which the output is transformed into 4-bit data of "1" (1111). Thus, the right mask pattern generating circuit 290 will output 16 dots "1" (1111111111111111). As the last 16 dots containing the right outline point are initiated to be processed, the output of the comparator circuit 284 is changed to "0", so that four low order bits of the X* coordinate of the right outline point are inputted into the right mask pattern generating circuit 290 through the OR circuit 286. The right mask pattern generating circuit 290 generates a mask pattern by which among the 16 dots containing the right outline point, the dot specified by the four low order bits and all the dots located in the left side of the specified dot are set at "1". Thus, the right mask pattern generating circuit 290 will generate a right mask pattern by which all dots located leftward from the X* coordinate of the right outline point are set at "1".

The left and right mask patterns respectively produced by the left and right mask pattern generating circuits 288, 290 are inputted into an AND circuit 292. Thus, there will be generated a mask pattern by which only dots between the X* coordinates of the left and right outline points are set at "1".

Figure 8:
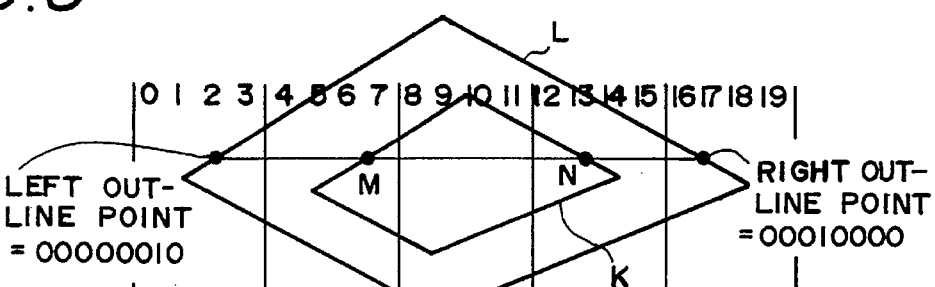
FIG. 8 is a diagram illustrating a procedure of processing in the processing dot instruction unit and end flag storage unit.

The operations of the processing dot instruction unit 37 and end flag storage unit 36 will be described with reference to FIG. 8 which shows a table illustrating the order of the processing steps. For simplicity, it is now assumed that the coordinate of each of the left and right outline points is defined by eight bits and that the process using the end flags is carried out for every four dots. Therefore, the number of bits in the respective data bus shown in FIGS. 6 and 7 becomes equal to the bracketed number of bits in FIGS. 6 and 7. In FIG. 8, a polygon K has already been drawn and a polygon L will be drawn overlapping the polygon K. In such a case, it is required that the painting step for dots between points M and N is omitted since the polygon K overlies the polygon L in the scene.

First of all, the X* coordinates of the left and right outline points are inputted into the registers 250, 252 and counter 254. It is now assumed that the X* coordinate of the left outline point is 8-bit data (00000010) and the X* coordinate of the right outline point is 8-bit data (00010000). As shown in FIG. 8 at Phase A, the initial value in the counter 254 is set to be six high order bits (000000) in the X* coordinate of the left outline point. The output of the counter 254 is inputted into the end flag storage unit 36 so that end flags for objective four dots are read out therefrom. Since the polygon K has already been drawn in FIG. 8, the end flag storage unit 36 has stored end flags used to make only the dots between M and N "1". However, the four objective dots do not overlap the dots between M and N. Accordingly, at Phase A, an end flag (0000) is read out and will be stored in the register 264 through the bidirectional buffer 262.

On the other hand, two low order bits (10) in the X* coordinate of the left Outline point is inputted into the left mask pattern generating circuit 288 shown in FIG. 7. The left mask pattern generating circuit 288 thus generates a left mask pattern by which the last two dots in Phase A are set at "1". Since the comparator circuit 284 receives the output of the counter (000000) and six high order bits of the X* coordinate of the right outline point (000100), it judges that there is an inequality and outputs "1". As a result, the right mask pattern generating circuit 290 generates a right mask pattern by which all the dots in Phase A are set at "1". In such a manner, the mask pattern generating circuit 256 will generate a mask pattern by which the last two dots are set at "1", as sown in FIG. 8.

The mask pattern (0011) and the output of the register 264 (0000) are sent to the OR circuit 258 at which they are taken logical OR with each other. The result is written back into the end flag storage unit 36 through the register 260 and the bidirectional buffer 262. Thus, the end flag for the objective four dots is rewritten from (0000) to (0011). As a result, the painting to the last two dots in this four dots will be inhibited during the subsequent computing process.

On the other hand, the mask pattern (0011) is inverted by the inverting circuit 266 and then taken logical OR with the output of the register 264 (0000). Data (1100) is thus stored in the register 274 through the multiplexer 272. The data (1100) means that "dot 0, 1" is not required to be painted and that "dot 2, 3" is an empty dot required to be painted.

The priority encoder 276 detects an empty dot having the minimum X* coordinate. In this example, a dot 2 or third empty dot is detected. Based on this detection, there is produced data (10) representing that the third dot is empty. This data (10) is used with the output of the counter 254 (000000) to form data (00000010) which in turn is outputted to the processor unit 30. Thus, the processor unit 30 will process a dot specified by the X* coordinate (000010).

On the other hand, the output (10) of the priority encoder 276 is given to the decoder 280 which in turn produces data (0010) by which only objective dots are set at "1". At the OR circuit 278, next, the data (0010) is taken logical OR with the output of the register 274 (1100) to produce data (1110) which is written back into the register 274.

The priority encoder 276 then detects that the fourth dot is empty and produces data (11). X* coordinate (00000011) is outputted to the processor unit 30. Thereafter, the decoder 280 generates data (0001). This data (0001) is taken logical OR with the output of the register 274 (1110) to produce data (1111) which in turn is written back into the register 274.

Since the priority encoder 276 does not detect any empty dot from the output of the register 274 (1111), the step in Phase A will terminate.

At Phase B, the counter 254 counts up to output data (000001). This causes an end flag (0001) to be read out from the end flag storage unit 36. The register 252 is cleared so that data (1111) is outputted from the mask pattern generating circuit 256. As a result, the end flag (1111) is written back into the end flag storage unit 36 while at the same time the data (0001) is stored in the register 274.

As shown in FIG. 8, subsequently, the empty dot detection loop 282 continues to detect empty dot until data stored in the register 274 varies from (0001) to (1111). X* coordinates (00000100), (00000101) and (00000110) will be successively outputted to the processor unit 30. As the data stored in the register 274 becomes (1111), the procedure proceeds to Phase C.

Dots to be processed at Phase C are those that have already been shaded by the polygon K. Therefore, the end flag is (1111) and the empty dot detection loop will not perform any treatment. Thus, the processing speed can greatly be increased.

In Phase D, the procedure begins at the fourteenth dot to be processed. Thus, X* coordinates (00001110) and (00001111) will sequentially be outputted from the processing dot instruction unit 37 to the processor unit 30.

In Phase E, the seventeenth and subsequent dots are outside the polygon L. Therefore, the right mask pattern becomes (1000) and the mask pattern also becomes (1000). As a result, the sixteenth dot data, that is, only the X* coordinate of the right outline point (00010000) will be outputted to the processor unit 30.

Since this embodiment comprises the processing dot instruction unit 37 and the end flag storage unit 36 as described, the hidden surface removal can be performed more effectively than the prior art. More particularly, this embodiment sequentially processes the polygons starting from the closest polygon to the view point in the scene. Even if the computing process cannot be completed during the necessary time period, it is substantially impossible that the data of the closest polygon to the view point is lost. Further, such a type of hardware can perform hidden surface removal more effectively at very high speed by the fact that the end flags are stored in the end flag storage unit 36. Since the data stored in the end flag storage unit 36 may be one-bit data, the capacity of the end flag storage unit 36 can greatly be reduced. Since the processing dot instruction unit 37 can decide whether or not the process should be carried out for every set of dots, the processing speed can greatly be increased.

Furthermore, this embodiment can provide a very simple structure capable of performing hidden surface removal since it utilizes a concept of using the mask pattern and end flag. Particularly, when this embodiment is to decide that the process should be carried out for every set of dots, the mask pattern and end flag may be treated for every set of dots. As a result, this embodiment can provide an image synthesizing system which is optimum for deciding dot to be processed for every set of dots.

The present invention is not limited to the aforementioned embodiment and can be embodied in various forms within the scope of the present invention.

Figure 9:
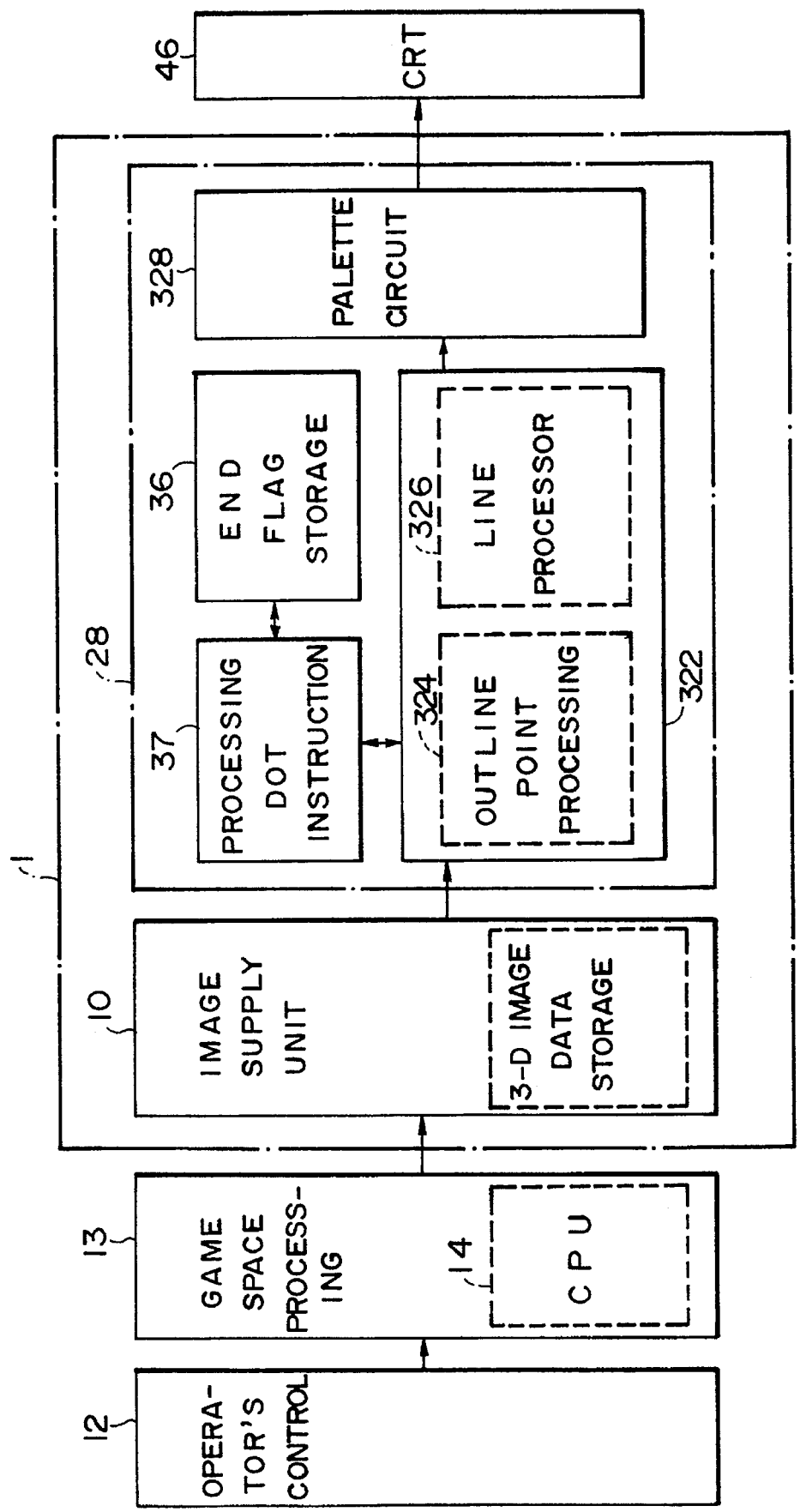
FIG. 9 is a block diagram showing a polygon generating circuit used as an image synthesizing unit.
Figure 10:
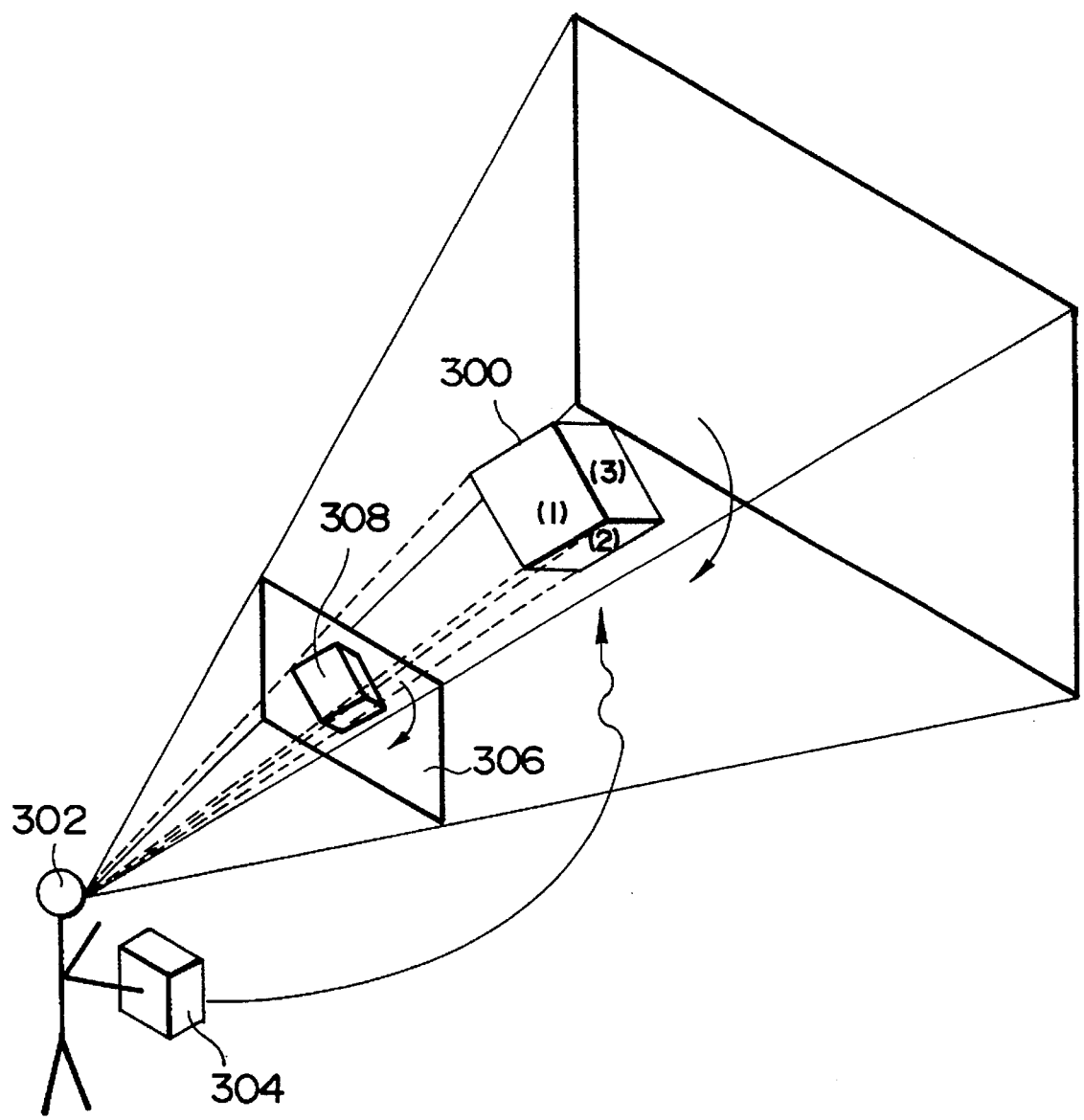
FIG. 10 is a schematic view illustrating an image synthesizing system which can synthesize a pseudo 3-D image.
Figure 11:
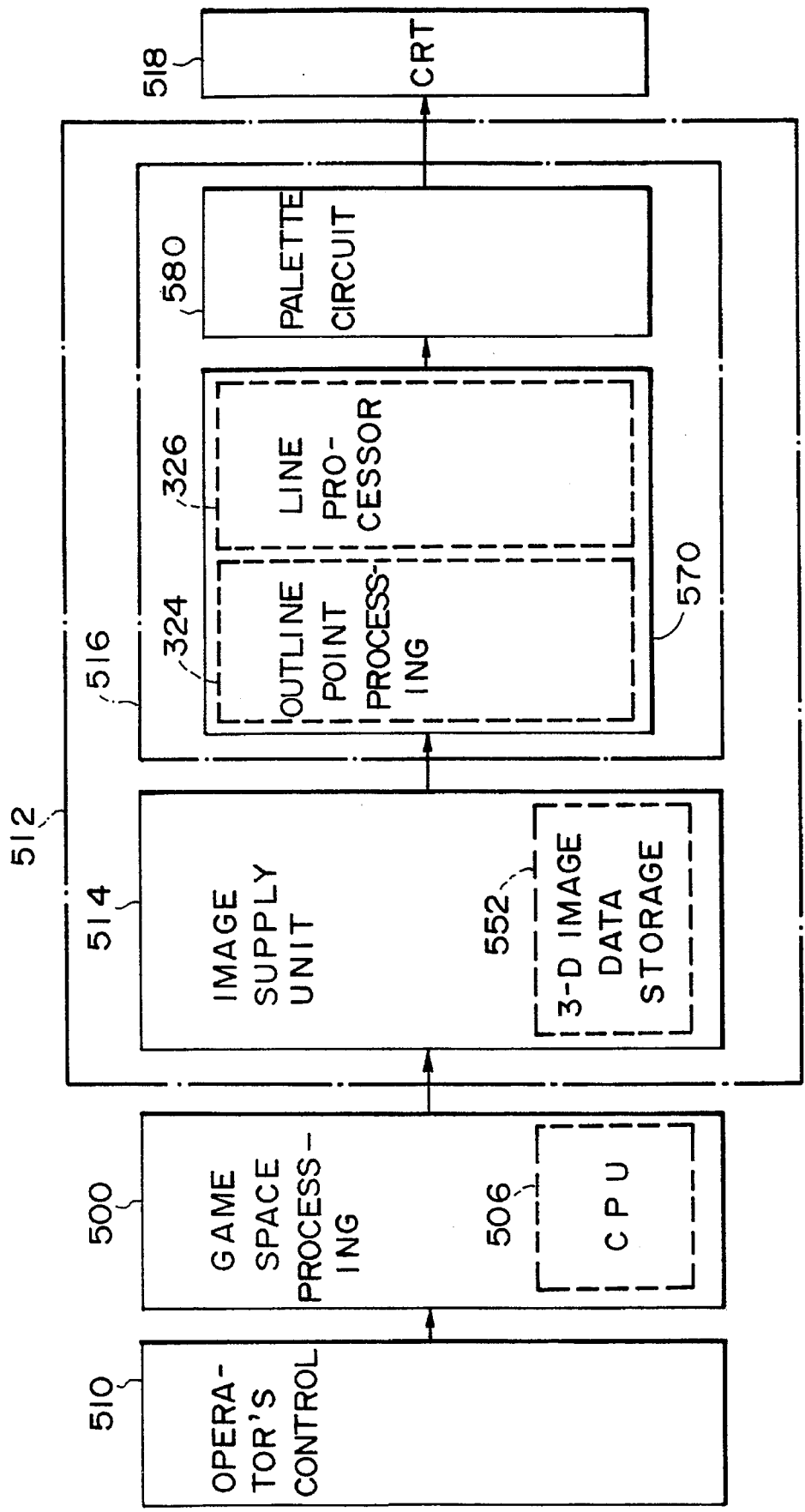
FIG. 11 is a block diagram showing an image synthesizing system constructed in accordance with the prior art.
Figure 12:
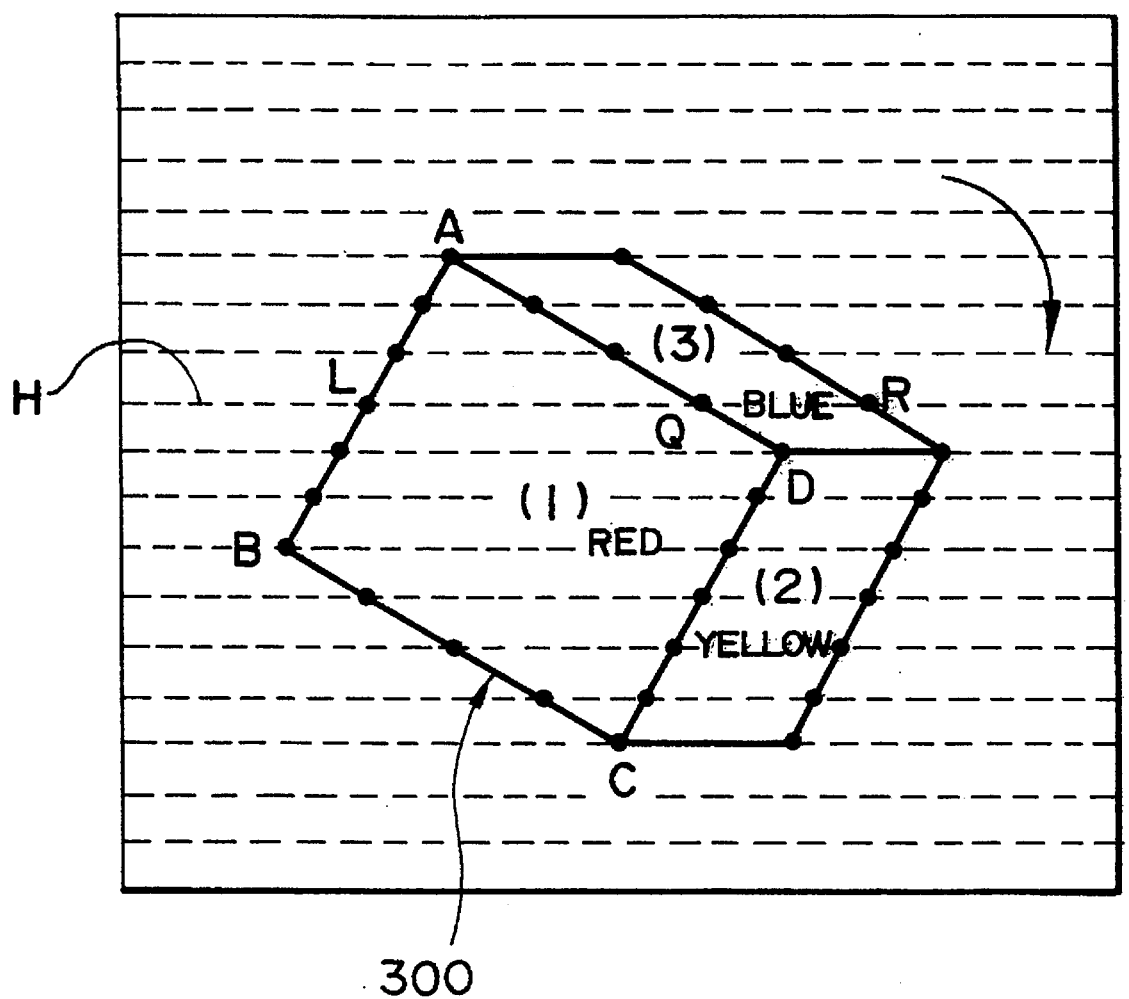
FIG. 12 is a schematic view illustrating a painting technique in the image synthesizing system of the prior art.

Although this embodiment has been described as to the image synthesization in which a texture is mapped to a polygon through tile texture mapping technique, the present invention is not limited to this embodiment, but may be applied to all the other types of image synthesization. For example, FIG. 9 is a block diagram illustrating the image synthesization carried out by a polygon generator 322. In such an embodiment, the polygon generator 322 includes an outline point processing unit 324 and a line processor 326.

The outline point processing unit 324 determines image data at the left and right outline points from image data containing coordinate data given to the vertices of the polygon, color data and so on. The line processor 326 is based on the image data of the left and right outline points to paint dots on scan lines connecting the left and right outline points with a given color data. In the line processor 326, the treatment for every scan line has higher priority than the treatment for every polygon, in contrast with the previous embodiment. More particularly, all dots of a polygon between the left and right outline points are painted for every scan line. Thus, the end flag storage unit 36 may have only a capacity corresponding to one scan line.

We claim:

1. An image synthesizing system for producing a projected image on a screen from a three-dimensional image which is defined by a plurality of three-dimensional polygons, the system comprising:

image forming means, responsive to image data of vertices of the plurality of three-dimensional polygons, for sequentially determining, through a given image rendering computing process, image data of a plurality of dots for each of the plurality of three-dimensional polygons defining the three-dimensional image, starting from the polygon closest to a view point, the image data of the plurality of dots representative of the projected image on the screen;

end flag storage means for storing a plurality of end flags, each one of said plurality of end flags corresponding to one of said dots on said screen, each end flag indicating whether said corresponding one of said dots has completed said image rendering computing process; and processing dot instruction means for reading one of said plurality of end flags from said end flag storage means, for instructing said image forming means to perform said image rendering process to said corresponding one of said dots only when said read end flag indicates that said corresponding one of said dots has not completed said image rendering computing process, and for changing the end flag to indicate that said corresponding one of said dots has completed said image rendering computing process.

2. An image synthesizing system as defined in claim 1, wherein said end flag storage means stores a set of the plurality of end flags, each set of the plurality of end flags corresponding to a set of the plurality of dots, said processing dot instruction means reads the set of the plurality of end flags and indicates the set of the plurality of dots to be processed by said image forming means.

3. An image synthesizing system as defined in claim 1, wherein said image rendering computing process of said image forming means determines, for each of said plurality of three-dimensional polygons, left and right outline points, said left and right outline points of one polygon based on the image data of vertices of said one polygon, said left and right outline points being intersecting points between edges of the one polygon and a scan line, the image rendering computing process determining the image data of each dot on the scan line between the left and right outline points, said processing dot instruction means using a mask pattern to indicate the dots on the scan line between said left and right outline points, said end flags corresponding to the dots between said left and right outline points indicating processed ones and unprocessed ones of the dots.

4. An image synthesizing system as defined in claim 2, wherein said image rendering computing process of said image forming means determines, for each of said plurality of three-dimensional polygons, left and right outline points, said left and right outline points of one polygon based on the image data of vertices of said one polygon, said left and right outline points being intersecting points between edges of the one polygon and a scan line, the image rendering computing process determining the image data of each dot on the scan line between the left and right outline points, said processing dot instruction means using a mask pattern to indicate the dots on the scan line between said left and right outline points, said end flags corresponding to the dots between said left and right outline points indicating processed ones and unprocessed ones of the dots.

5. An image synthesizing system as defined in claim 1, wherein said image forming means computes, for each one of said plurality of three-dimensional polygons, the image data of the dots defining said each one of the plurality of polygons based on color data and coordinate data of the vertices of said each one of the plurality of polygons.

6. An image synthesizing system as defined in claim 2, wherein said image forming means computes, for each one of said plurality of three-dimensional polygons, the image data of the dots defining said each one of the plurality of polygons based on color data and coordinate data of the vertices of said each one of the plurality of polygons.

7. An image synthesizing system as defined in claim 3, wherein said image forming means computes, for each one of said plurality of three-dimensional polygons, the image data of the dots defining said each one of the plurality of polygons based on color data and coordinate data of the vertices of said each one of the plurality of polygons.

8. An image synthesizing system as defined in claim 4, wherein said image forming means computes, for each one of said plurality of three-dimensional polygons, the image data of the dots defining said each one of the plurality of polygons based on color data and coordinate data of the vertices of said each one of the plurality of polygons.

9. An image synthesizing system as defined in claim 1, wherein said image forming means computes, for each one of said plurality of three-dimensional polygons, the image data of the dots defining said each one of the plurality of polygons based on coordinate data and texture data of the vertices of said each one of the plurality of polygons.

10. An image synthesizing system as defined in claim 2, wherein said image forming means computes, for each one of said plurality of three-dimensional polygons, the image data of the dots defining said each one of the plurality of polygons based on coordinate data and texture data of the vertices of said each one of the plurality of polygons.

11. An image synthesizing system as defined in claim 3, wherein said image forming means computes, for each one of said plurality of three-dimensional polygons, the image data of the dots defining said each one of the plurality of polygons based on coordinate data and texture data of the vertices of said each one of the plurality of polygons.

12. An image synthesizing system as defined in claim 4, wherein said image forming means computes, for each one of said plurality of three-dimensional polygons, the image data of the dots defining said each one of the plurality of polygons based on coordinate data and texture data of the vertices of said each one of the plurality of polygons.

* * * * *